Aug. 11, 1970   W. H. MITCHELL ET AL   3,523,673
HERMETICALLY SEALED VALVE
Filed Feb. 24, 1969

William H. Mitchell
William J. Reagan
INVENTORS

BY *William R. Wright*
THEIR AGENT

United States Patent Office 3,523,673
Patented Aug. 11, 1970

---

3,523,673
HERMETICALLY SEALED VALVE
William H. Mitchell, Randolph Township, Dover County,
N.J., and William J. Regan, Los Angeles, Calif.,
assignors to Thiokol Chemical Corporation, Bristol, Pa.,
a corporation of Delaware
Filed Feb. 24, 1969, Ser. No. 801,630
Int. Cl. F16k 31/12
U.S. Cl. 251—24                                4 Claims

---

ABSTRACT OF THE DISCLOSURE

An on-off reusable flow control valve is provided in which the entire housing of the valve including the selective operating means is completely hermetically sealed so that fluids contained within or passing through the valve cannot leak out nor can outside fluids enter. The valve is particularly useful where the fluid in the valve is of an explosive, corrosive or highly flammable nature such as gaseous or liquid hydrogen, rocket propellants and some acids.

---

The present invention relates to reusable flow control valves and in particular relates to one in which the fluids passing through the valve, or contained in it, are hermetically sealed from passage to the valve's surroundings.

One of the problems associated with fluid systems in which highly corrosive, highly flammable or explosive gases or liquids are the flowing fluids is how to eliminate even the slightest leakage of the fluid and yet provide a valve for stopping or permitting the flow of fluid in a positive and efficient manner without the need for a complicated mechanism needing frequent maintenance. For example, in the valving of liquid hydrogen the slightest pinhole leak will allow hydrogen to pass out into the surrounding atmosphere in sufficient quantity to produce a most dangerous explosive atmosphere in a very short interval of time. The same problem exists in varying degree with other fluids. The problem then is two fold involving the provision of a completely tight seal and a valve mechanism which can be operated easily and effectively without disturbance to the seal. Ordinarily valves intended to solve this problem become complex in their structure and become correspondingly heavy in the attempt to provide adequate seals. Even so, leakage may occur as the seals are disturbed as the valve controls are operated. The present invention, however, solves this two-fold problem by housing the valve mechanism in a hermetically sealed completely leakproof welded assembly wherein the welded seams of the structure are entirely undisturbed by the operation of the valve controls, and yet the interior mechanism is simple, relatively light in weight, effective in permitting or stopping fluid flow and essentially maintenance free.

It is, therefore, an object of the present invention to provide a valve of leakproof, fully hermetically sealed construction useful for effectively and efficiently, in a selective manner, permitting and stopping the flow of a flammable, explosive or toxic fluid in a fluid system without disturbance to the hermetic seals.

It is also an object of the present invention to provide a valve of the foregoing type in which the valve mechanism is simple, positive and effective in operation, relatively light in weight and generally maintenance free.

Other objects and advantages of the present invention will become apparent from the detailed description which follows:

Figure 1:
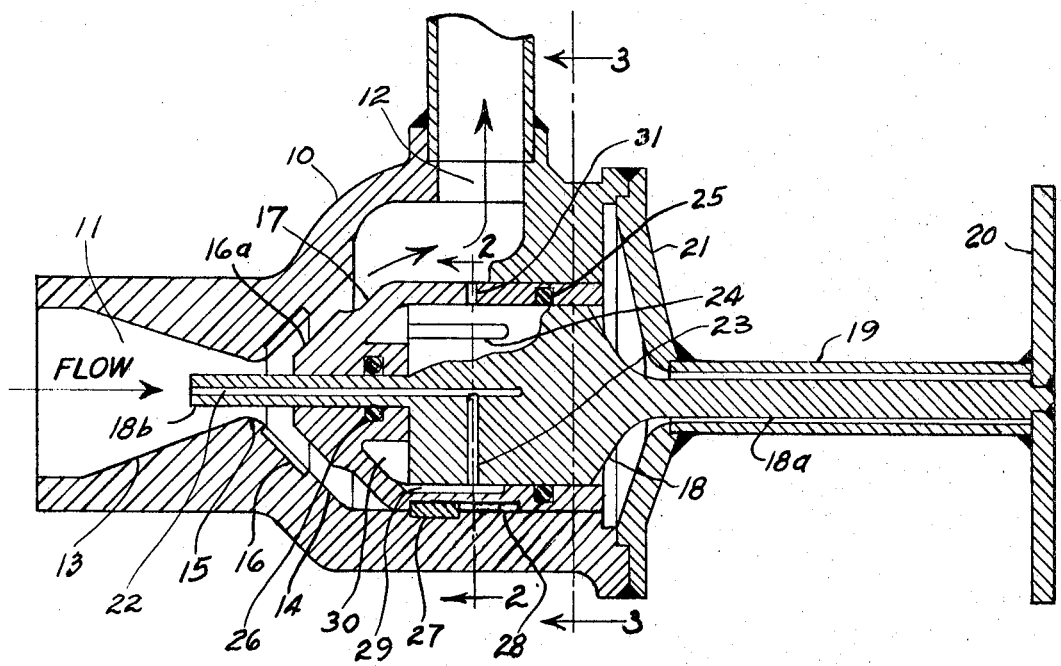
FIG. 1 is a longitudinal vertical cross sectional view of the entire valve showing its hermetically sealed housing.
Figure 2:
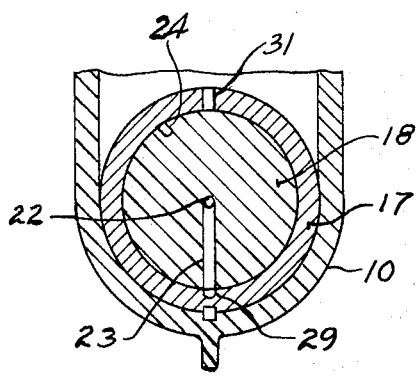
FIG. 2 is a cross sectional view taken on line 2—2 looking in the direction of the arrows.
Figure 3:
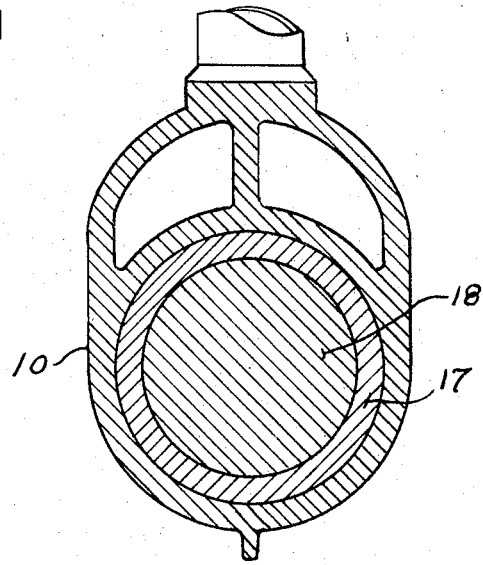
FIG. 3 is a cross sectional view taken on line 3—3 looking in the direction of the arrows.

A preferred embodiment of the present invention is shown in FIG. 1 in which a body or housing 10 has an inlet 11 and an outlet 12, with inlet 11 being in the form of a venturi including a convergent portion 13, a divergent portion 14 and a throat 15. Annular seal 16 is provided in the wall of the divergent portion 14 in the location shown in the drawing adjacent the throat 15 and is intended to be made of a plastic material such as polytetrafluoroethylene. At the right of inlet 11 in FIG. 1, and centrally located with respect to its longitudinal axis and to body 10, is poppet 17 slidably mounted on pintle 18 but in such close sliding relationship thereto that the surface tension and viscosity of the liquid being valved effect an adequate seal against cross flow of fluid between these parts. Pintle 18 is solid in form and extends outward from body 10 through a hollow torque tube 19 and terminates in torque arm 20, the integral extension of the pintle being designated in FIG. 1 of the drawings as 18a. The torque arm 20 is fixedly attached to pintle extension 18a by a continuous, leakproof weld after the torque tube 19 and torque arm 20 have been assembled to the cover also by leakproof welding. Pintle 18 also has an extended tubular portion or neck 18b at its left hand side which is directed axially of pintle 18 and extends out from it into the convergent portion 13 of inlet 11. A passage 22 extends centrally through neck 18b and communicably connects with lateral, radial passage 23 as shown in FIGS. 1 and 2. Also a groove or slot passage 24 is cut into the surface of pintle 18 in a direction longitudinal of pintle 18 and located about 30 degrees from the centerline of passage 24 as shown in FIGS. 1 and 2.

A hollow annular piston 17 is fitted over pintle 18 and over its extension 18b and is slidable thereon toward or away from inlet 11 with its full movement being from a first or "open" position with piston 17 all the way to the right in FIG. 1 to a second or "closed" position with piston 17 all the way to the left in FIG. 1 (FIG. 1 shows the piston 17 in the "open" position). As piston 17 moves into the "closed" position, bevelled annular face 16a contacts annular seat 16 located in divergent nozzle portion 14 adjacent to throat 15 to shut off the flow of fluid through the inlet 11. Conversely, movement of piston 17 to the "open" position removes face 16a from seat 16 and permits fluid to flow from inlet 11 into the interior of the valve body 10 and out of the outlet 12.

It is intended that piston 17 be freely slidable on pintle 18 but that it must fit on it very closely in a lapped fluid-tight fit so that fluid cannot pass between the two members nor cross flow from a passage to an outlet or vice versa when the passage and outlet are not directly exposed to one another. In addition to the close fit, O-ring seals 25 and 26 are provided between the piston 17 and the pintle 18 and its tubular extension 18b to preclude leakage at their locations.

Piston 17 is prevented from rotating by key 27 which is set in body 10 but extends upwardly into track 28 which allows piston 17 to slide for its full travel but nevertheless prevents its rotation.

The valve is assembled by first placing the piston 17 inside of piston 17 with its passages 23 and 24 located as shown in FIGS. 1 and 2, i.e., with passage 23 in communication with groove passage 29. Cover 21, torque tube 19 and torque arm 20 are then welded together to form hermetic seals at the welds and this assembly is then slid over pintle extension 18a until cover 21 seats on body 10 and extension 18a extends through torque arm 20. Hermetic completely leakproof welds are then made at these intersections and the valve is ready for operation.

OPERATION

With the pintle in the position shown in FIGS. 1 and 2, fluid which enters passage 22 will flow into and through passages 23 and 29 and will fill chamber 30, the liquid pressure rising therein until it equals upstream line (inlet) pressure. As a result of this, the pressure force on the inside of poppet 17 becomes greater than that exerted on its exterior because its left end exterior is in a relatively low pressure area because of the venturi effect of the convergent divergent nozzle. Poppet 17 is therefore moved to the left in FIG. 1 up against annular seal 16 to close inlet 11 against all flow of fluid.

The handle 20 is then rotated in a clockwise direction (the upper end into the paper in FIG. 1) sufficiently to twist torque tube 19 and to rotate pintle 18 into the "open" position where passages 24 and 31 communicate and passages 23 and 29 are blocked off from one another. As this occurs the fluid under pressure inside of poppet 17 enters passage 24 and passes through both it and aperture 31 into the interior of housing 10. This relieves the internal pressure force on poppet 17 and it moves to the right in FIG. 1 returning to the "open" position in which the flow path is again open from inlet 11 to outlet 12. From the foregoing, it will be seen that at no time is any hermetic seal broken or disturbed, the amount of rotational twist necessary to move the pintle from the "open" to the "close" position being taken up entirely by the torque tube 19.

What is claimed is:

1. A hermetically sealed fluid valve comprising, in combination, an enclosed valve housing, an inlet thereto and outlet therefrom, said inlet having a convergent-divergent venturi form including a throat, a hollow skirted sliding poppet associated with said inlet and adapted to selectively open or close said inlet, means preventing rotation of said poppet with respect to said housing, a pintle slidable and rotatable within the poppet, hermetically sealed means adapted to rotate said pintle with respect to said poppet from a "closed" position to an "open" position, fluid passage means communicably connecting the inlet with the interior of the poppet when the pintle is in the "closed" position, and fluid passage means communicably connecting the interior of the poppet with the interior of the housing when the pintle is in the "open" position, whereby the valve is selectively opened or closed by movement of the pintle to the respective "closed" or "open" position to cause the poppet to move to respectively block the inlet or move away from it to close or open the valve.

2. The invention set forth in claim 1 with the means for rotating the pintle comprising a pintle extension rod with a concentric torque tube fixedly attached to the extension at its outer end and to the housing at its inner end and hermetically sealed at its points of attachment to both, and means for applying torque to said tube and to said pintle extension to cause the pintle to rotate from the "open" to the "closed" position and vice versa.

3. The invention set forth in claim 2 with the passages connecting the interior of the housing with the interior of the poppet comprising an aperture through the poppet wall exposed to the interior of the housing and a groove in that pintle surface in contact with the apertured surface of the poppet and extending at least from the aperture to the interior of the poppet.

4. The invention set forth in claim 3 with the passage means connecting the inlet upstream of the throat of the venturi and the interior of the poppet comprising a hollow tubular pintle neck extended from the pintle into the inlet upstream of the throat of the venturi, a lateral passage leading from it to the interface between the poppet and pintle and a passage in the poppet skirt affording communicable connection from the lateral passage to the interior of the poppet when the pintle is in the "closed" position.

References Cited

UNITED STATES PATENTS

| | | | |
|---|---|---|---|
| 1,005,641 | 10/1911 | Gilson | 251—25 |
| 1,679,774 | 8/1928 | Larner | 251—24 X |
| 2,520,288 | 8/1950 | Shand et al. | 74—18 |

ARNOLD ROSENTHAL, Primary Examiner

U.S. Cl. X.R.

74—18; 251—25